(12) United States Patent
Price et al.

(10) Patent No.: US 11,580,713 B2
(45) Date of Patent: Feb. 14, 2023

(54) MOTION COMPENSATION FOR A SPAD ARRAY CAMERA

(71) Applicant: Microsoft Technology Licensing, LLC, Redmond, WA (US)

(72) Inventors: Raymond Kirk Price, Redmond, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 44 days.

(21) Appl. No.: 17/147,378

(22) Filed: Jan. 12, 2021

(65) Prior Publication Data

US 2022/0222906 A1 Jul. 14, 2022

(51) Int. Cl.
*G06T 19/20* (2011.01)
*G06T 7/70* (2017.01)
(Continued)

(52) U.S. Cl.
CPC .............. *G06T 19/20* (2013.01); *G01D 5/39* (2013.01); *G01P 3/38* (2013.01); *G01S 17/894* (2020.01); *G06T 7/70* (2017.01)

(58) Field of Classification Search
None
See application file for complete search history.

(56) References Cited

U.S. PATENT DOCUMENTS

| 2005/0259888 | A1* | 11/2005 | Ozluturk | G02B 27/646 382/260 |
| 2006/0182355 | A1* | 8/2006 | Shin | H04N 19/137 375/E7.176 |

(Continued)

FOREIGN PATENT DOCUMENTS

| WO | 2005093654 A2 | 10/2005 |
| WO | 2017004663 A1 | 1/2017 |

OTHER PUBLICATIONS

Seets, et al., "Motion Adaptive Deblurring With Single-Photon Cameras", In Repository of arXiv:2012.07931v1, Dec. 14, 2020, 23 Pages.
Chi, et al., "Dynamic Low-Light Imaging with Quanta Image Sensors", In Proceedings of European Conference on Computer Vision, Nov. 12, 2020, pp. 122-138.
"International Search Repod and Written Opinion Issued in PCT Application No. PCT/US2021/053601", dated Jan. 12, 2022, 13 Pages.

(Continued)

*Primary Examiner* — Kee M Tung
*Assistant Examiner* — Jed-Justin Imperial
(74) *Attorney, Agent, or Firm* — Alleman Hall Creasman & Tuttle LLP

(57) ABSTRACT

Examples are disclosed that relate to motion compensation on a single photon avalanche detector (SPAD) array camera. One example provides a method enacted on an imaging device comprising a SPAD array camera and a motion sensor, the SPAD array camera comprising a plurality of pixels. The method comprises acquiring a plurality of subframes of image data. Each subframe of image data comprises a binary value for each pixel. Based upon motion data from the motion sensor, the method further comprises determining a change in pose of the imaging device between adjacent subframes, applying a positional offset to a current subframe based upon the motion data to align a location of a stationary imaged feature in the current subframe with a location of the stationary imaged feature in a prior subframe to create aligned subframes, summing the aligned subframes to form an image, and outputting the image.

20 Claims, 8 Drawing Sheets

(51) Int. Cl.
  *G01S 17/894* (2020.01)
  *G01D 5/39* (2006.01)
  *G01P 3/38* (2006.01)

(56) References Cited

U.S. PATENT DOCUMENTS

| | | | | |
|---|---|---|---|---|
| 2011/0200113 | A1* | 8/2011 | Kim | H04N 19/105 |
| | | | | 375/E7.113 |
| 2015/0117708 | A1* | 4/2015 | Guigues | G06T 7/246 |
| | | | | 382/103 |
| 2018/0007382 | A1* | 1/2018 | Pio | G06N 3/0454 |
| 2018/0220073 | A1* | 8/2018 | Keal | H04N 5/23258 |
| 2020/0137409 | A1* | 4/2020 | Michail | H04N 19/513 |
| 2021/0319606 | A1* | 10/2021 | Gupta | G06T 3/0093 |

OTHER PUBLICATIONS

"Quanta Burst Photography—Wision Lab Web", Retrieved From: https://wisionlab.cs.wisc.edu/project/quanta-burst-photography/, Retrieved On: Jan. 13, 2021, 6 Pages.

Ma, et al., "Quanta Burst Photography", In Journal of ACM Transactions on Graphics (TOG), vol. 39, Issue 4, Jul. 8, 2020, 28 Pages.

* cited by examiner

MOTION COMPENSATION FOR A SPAD ARRAY CAMERA

BACKGROUND

A single photon avalanche detector (SPAD) array camera may be used to capture a low light signal, such as in low light conditions, to form an image. Each pixel of a SPAD array sensor is configured to create an avalanche event of electrons upon generation of a photoelectron by a photon incident on the pixel. The avalanche of electrons triggered by the incident photon represents a digital readout of a logical 1 for a pixel, while the lack of an avalanche event triggers a readout of a logical 0 for the pixel. The array of logical 1s and 0s from a single time-gating of a SPAD array sensor represents a subframe of binary image data. The sensor may be time-gated at a relatively high frequency (e.g. approximately 10-200 kHz) to generate a series of binary subframes. An intensity image (grayscale, or color where appropriate color filters are located above pixels) is formed by summing a number of binary subframes based upon an image frame rate of the SPAD array camera (e.g. 30-120 Hz, as examples).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to motion compensation on a single photon avalanche detector (SPAD) array camera. One example provides a method enacted on an imaging device comprising a SPAD array camera and a motion sensor, the SPAD array camera comprising a plurality of pixels each configured to sense light. The method comprises acquiring a plurality of subframes of image data, wherein each subframe of image data comprises a binary value for each pixel, and the plurality of subframes comprises a first subframe and a second subframe. Based upon motion data from the motion sensor, the method further comprises determining a change in pose of the imaging device between the first subframe and the second subframe, applying a positional offset to the second subframe based upon the motion data to align a location of a stationary imaged feature in the second subframe with a location of the stationary imaged feature in the first subframe to create aligned subframes, summing the aligned subframes to form an image, and outputting the image.

DETAILED DESCRIPTION

As introduced above, a SPAD array camera is a time-gated imaging device that generates image subframes having pixel values comprising logical 1s or 0s, respectively representing an avalanche event or no avalanche event for a time gate. An intensity image is generated by summing a series of binary subframes. However, a mobile device utilizing a SPAD array camera may possibly experience movement while capturing subframes during image generation. This may cause motion blur in the final image. One approach to reduce motion blur in the final image is to use deblurring algorithms as a post processing step after image sub-frames are summed. However, such post-processing deblurring algorithms can require extra processing power, which may result in more frequent battery recharging and shorter battery lifetime.

Accordingly, examples are disclosed that relate to mitigating blurring arising from motion by using motion data to adjust the binary image data of the SPAD array camera while the image data is captured. Briefly, the disclosed examples align subframes of binary image data based upon motion data from a motion sensor, thereby compensating for motion that occurs during image acquisition. An unblurred image is generated from summing the series of aligned subframes, thereby avoiding deblurring as a post-processing step.

Figure 1:
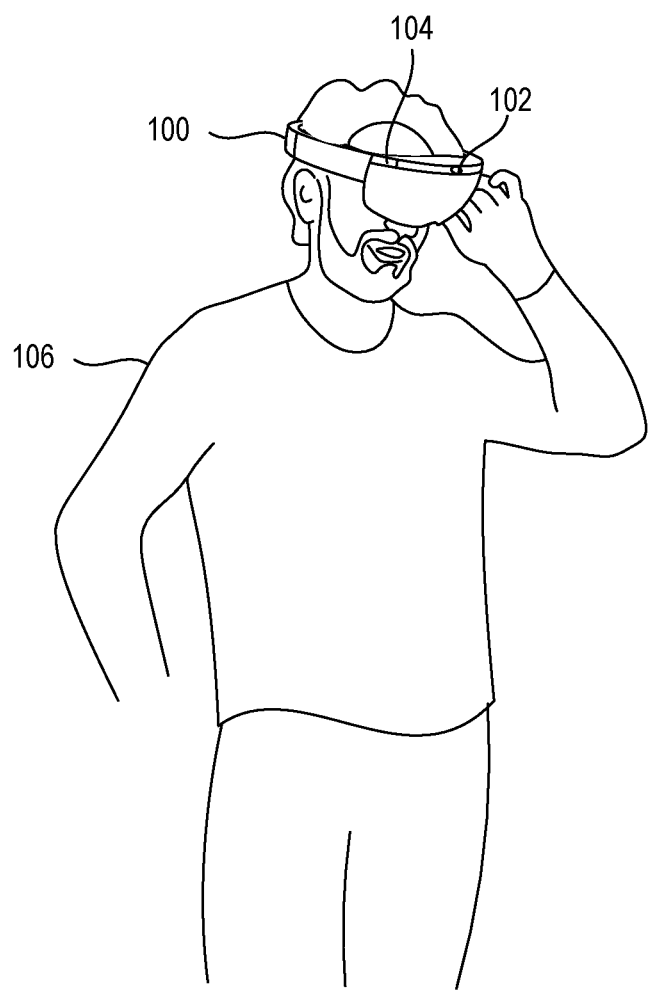
FIG. 1 shows an example imaging device that comprises a SPAD array camera and a motion sensor.

FIG. 1 shows an example imaging device 100 comprising a single photon avalanche detector (SPAD) array camera 102 and motion sensor 104. While imaging device 100 comprises a mobile device in the form of a head mounted display (HMD), in other examples an imaging device comprising a SPAD array camera and motion sensor may be implemented in any other suitable form, such as a handheld system or a vehicle (e.g. aircraft such as a drone, or automobile such as an autonomous automobile).

Data from motion sensor 104 can be used to determine a change in pose of imaging device 100, where the term "pose" indicates a location and orientation of the imaging device 100 in the use environment. Motion sensor 104 includes an inertial measurement unit (IMU) having one or more accelerometers, gyroscopes, and/or magnetometers. In some examples, other motion/position sensors, such as a global positioning system (GPS) sensor, may be included.

Figure 2A:
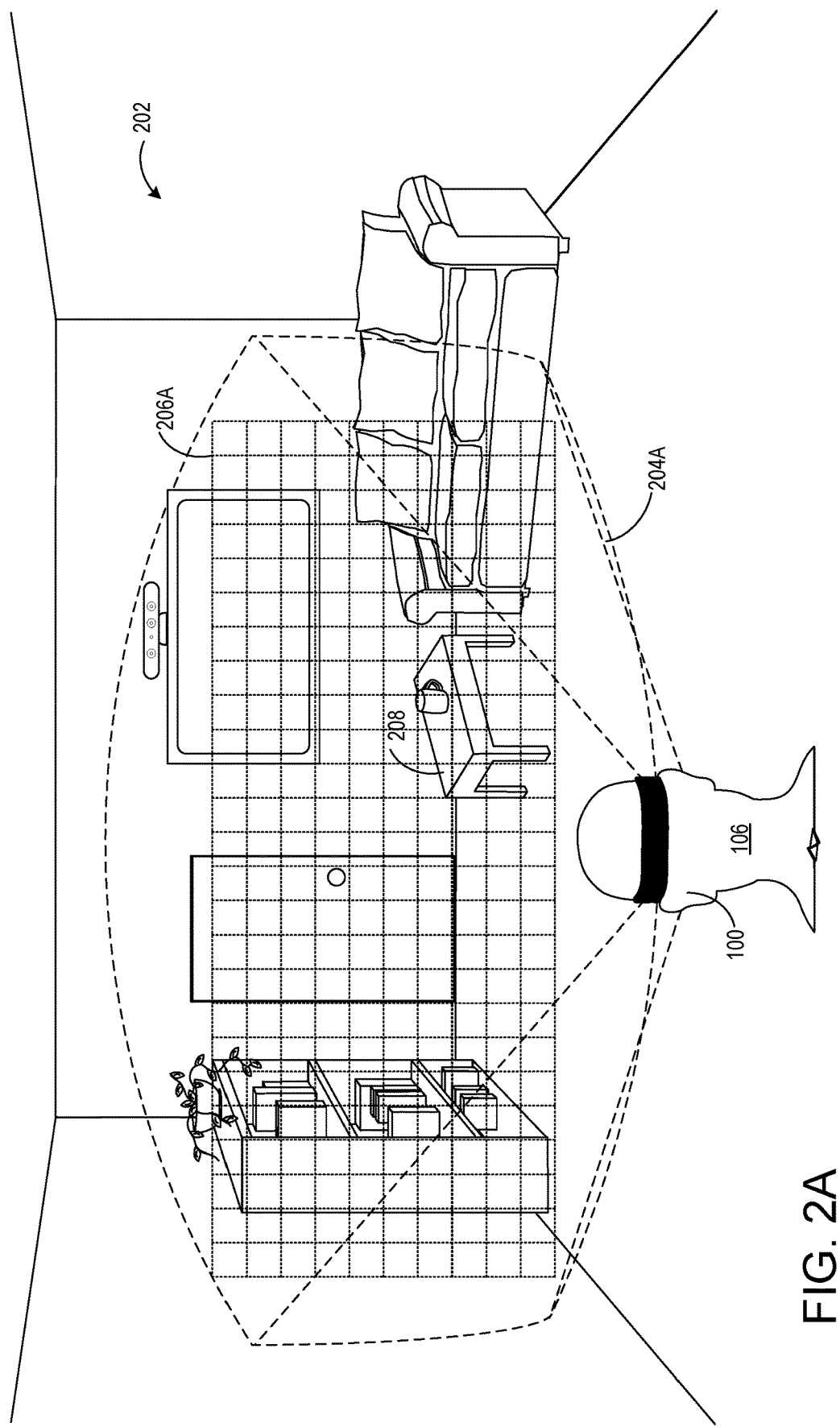
FIGS. 2A and 2B shows an example scene viewed by the imaging device of FIG. 1 in different poses.
Figure 2B:
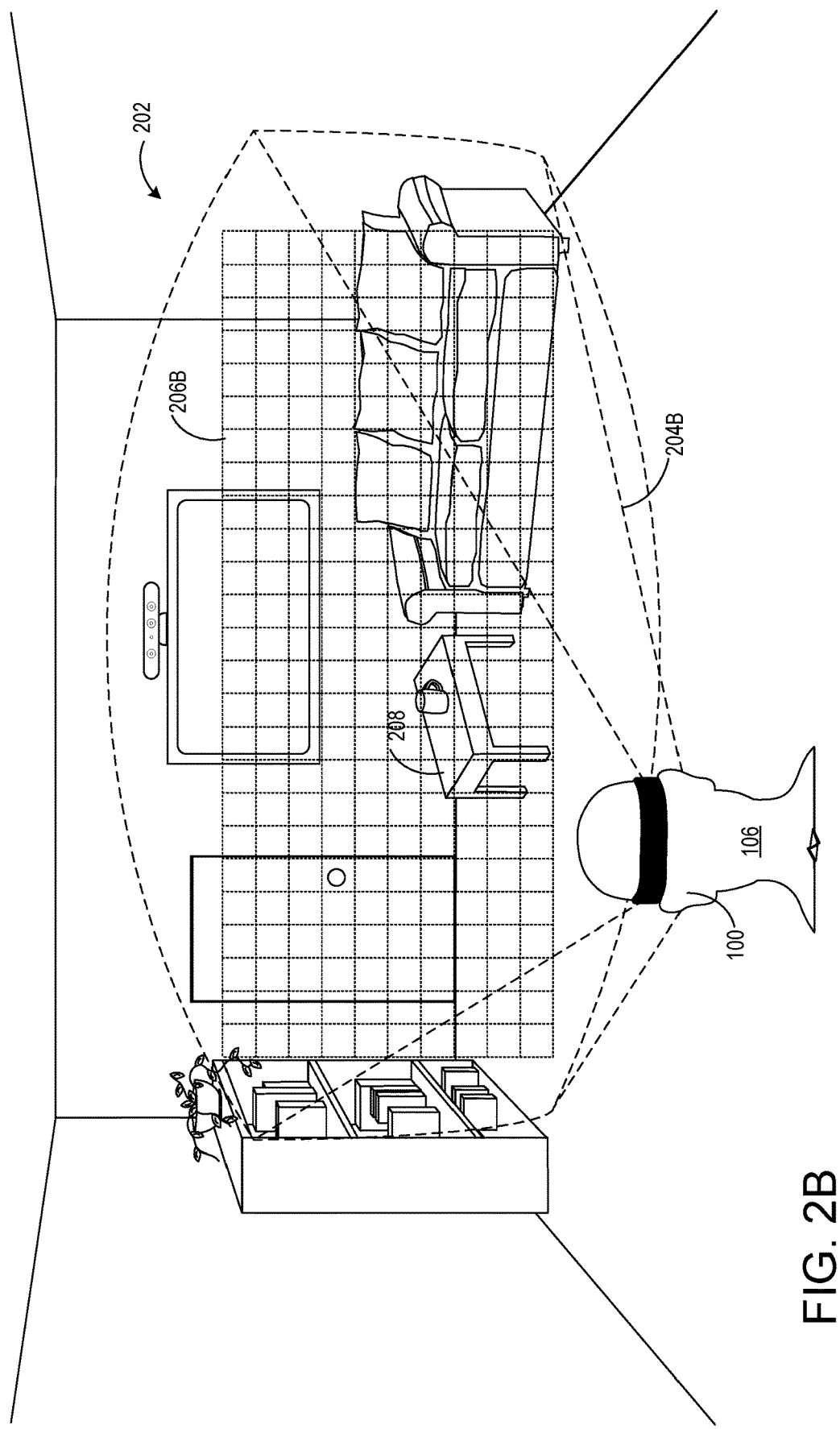

FIG. 2A and FIG. 2B show an example scene 202 as viewed by imaging device 100. Imaging device 100, in a first pose 204A, captures a first subframe (indicated schematically at 206A) and, in a second pose 204B, captures a second subframe (indicated schematically at 206B). Data from motion sensor 104 is used to determine a change in pose of imaging device 100 between first pose 204A and second pose 204B. The change in pose of the imaging device 100 is then used to determine an offset between second subframe 206B and first subframe 206A. This offset can then be applied to shift second subframe 206B (or first subframe 206A) and align the subframes with respect to stationary objects in scene 202, thereby allowing the subframes to be summed in an alignment that mitigates blur that would otherwise arise from summing misaligned subframes.

Figure 3:
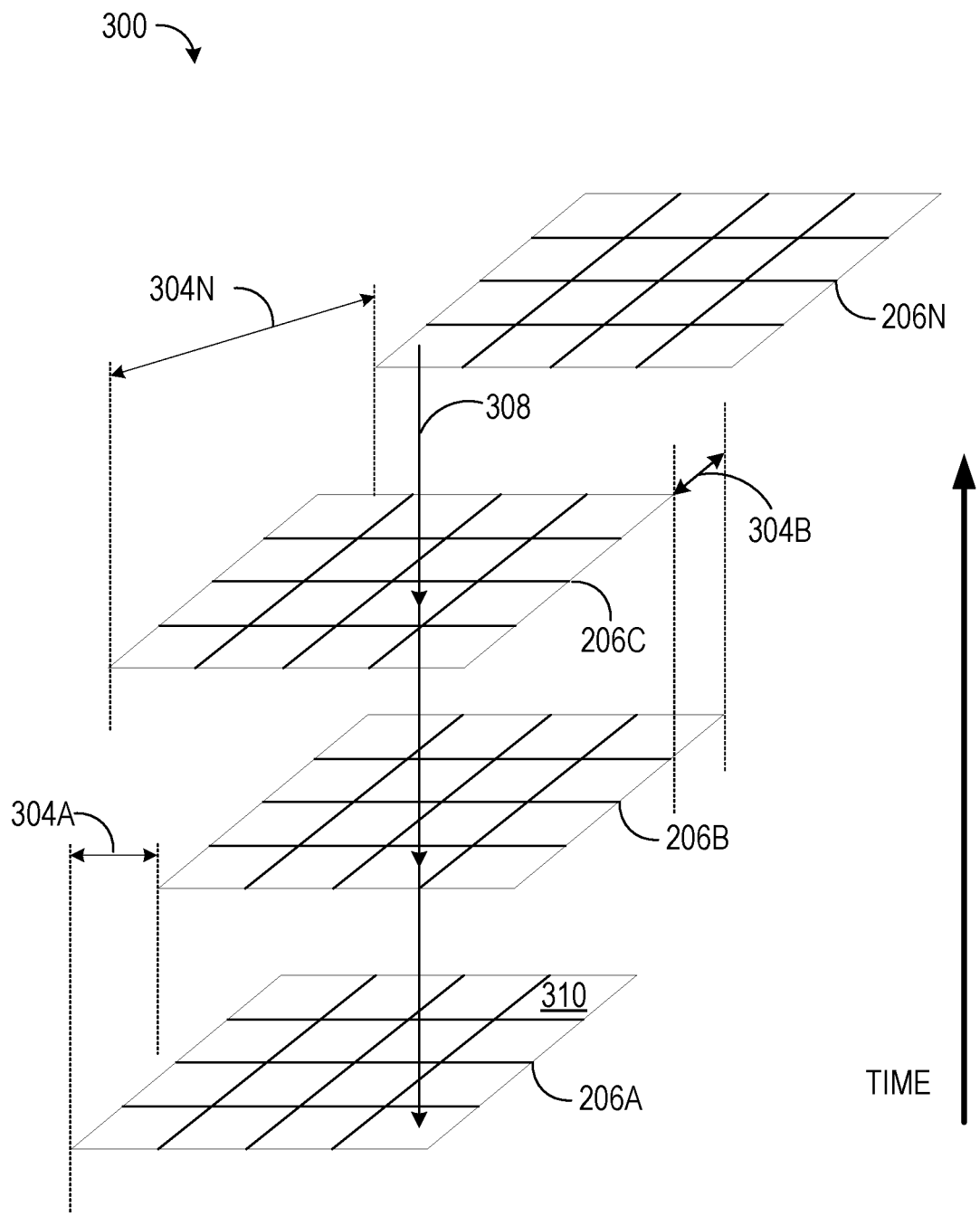
FIG. 3 schematically shows an example alignment of binary subframes of the scene in FIGS. 2A and 2B.

FIG. 3 schematically illustrates the summing of a plurality of subframes. Here, an arbitrary number N of subframes, shown as 206A, 206B, 206C, through 206N, are shown as aligned subframes 300, where N indicates an arbitrary number of subframes after subframe C. While each depicted subframe comprises sixteen pixels 310 for simplicity, it will be understood that each subframe of a SPAD array camera comprises a much larger array of pixels than illustrated. Further, while four subframes are shown for simplicity, any suitable number of subframes may be summed in the manner illustrated to form an image. In some examples, subframes may be acquired at a frequency of between 10 and 245 kHz and summed to produce image frames at a frequency of between 5 and 120 Hz.

Arrow 308 of FIG. 3 indicates a location of a stationary imaged feature, such as object 208, within each subframe of image data. Imaging device 100, using data from motion sensor 104, determines a first positional offset 304A to align a location of a stationary imaged feature 308 in the second subframe 206B with a location of stationary imaged feature 308 in the first subframe 206A, where first positional offset 304A is determined based on the difference between first pose 204A and second pose 204B. To determine first positional offset 304A from the motion data, in some examples a rotational model that relates signals from the motion sensor to corresponding translations of a pixel location on the SPAD array sensor in horizontal and vertical directions can be applied. Such a rotational model maps a point in a field of view of the SPAD array camera to a pixel based upon device pose. In some examples, both signals from the motion sensor and a distortion model of a lens system comprising one or more lenses of the SPAD array camera can be used in the rotational model, wherein the distortion model for the lens system can be determined via a calibration process.

Similarly, second positional offset 304B is determined and used to align third subframe 206C to first subframe 206A and second aligned subframe 206B. Additional positional offsets may be determined and used for other subframe alignments, as indicated cumulatively as 304N, to generate aligned subframes 300.

Either progressively during the capture of the N binary subframes, or after the capture of the N binary subframes, the aligned subframes 300 are summed to form an image. As previously mentioned, binary subframes in a SPAD array camera comprise binary pixels that can have values of logical 1 or 0. Thus, aligned subframes 300 can be summed by maintaining a pixel count for each pixel of the image, where each pixel count comprises a sum of the binary values for the pixel of the image across all aligned subframes. The pixel count for the pixel of the image can be incremented as each subframe is acquired and positionally adjusted (where motion has occurred). As each new subframe of image data is collected and positionally adjusted (if motion has occurred), the pixel count is updated. Upon aligning and summing subframe 206N, the resulting intensity image output is generated.

While aligning individual subframes is depicted in FIG. 3, it is to be noted that, in some examples, two or more subframes can be grouped together in a group of subframes, and an adjustment based upon motion data can be applied to the grouped subframes, rather than to individual subframes. In some such examples, a number of subframes grouped together for collective motion compensation can vary depending on the amount of movement imaging device 100 experiences between subframes.

Figure 4:
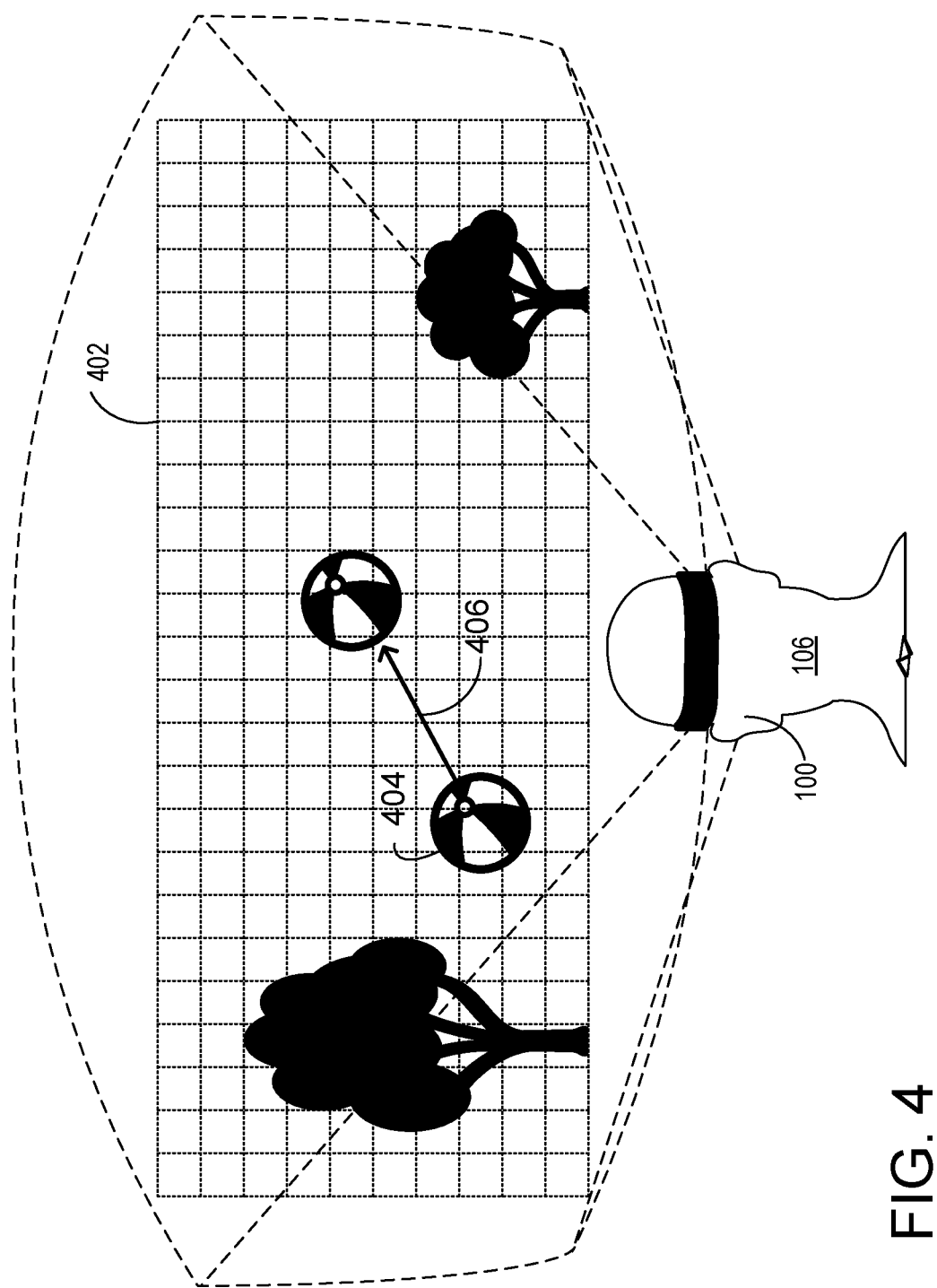
FIG. 4 shows an example scene with a dynamic object imaged by the imaging device of FIG. 1.

In the example of FIGS. 2-3, motion blur compensation is performed based upon the motion of a SPAD array camera relative to stationary objects in a scene. However, in some instances, a SPAD array camera may image an object that is moving relative to a stationary background. This is illustrated in FIG. 4, which shows an example field of view of the SPAD array camera of FIG. 1 imaging a scene comprising a dynamic object 404. The dynamic object 404 is illustrated via arrow 406 as moving relative to a stationary background in a manner that may cause motion blur of dynamic object 404 during image capture. In such instances, the use of method 300 described above may not mitigate blurring of the moving object, as motion of the dynamic object is not sensed by a motion sensor on imaging device 100.

Thus, to help mitigate any motion blur arising from motion of dynamic object 404, imaging device 100 may determine a motion vector per binary pixel per subframe by comparing temporally adjacent subframes. Binary pixels that image the dynamic object 404 will comprise different motion vectors than binary pixels not imaging the dynamic object 404. Such motion vectors therefore may be used to correct for the motion and avoid blur.

Figure 5:
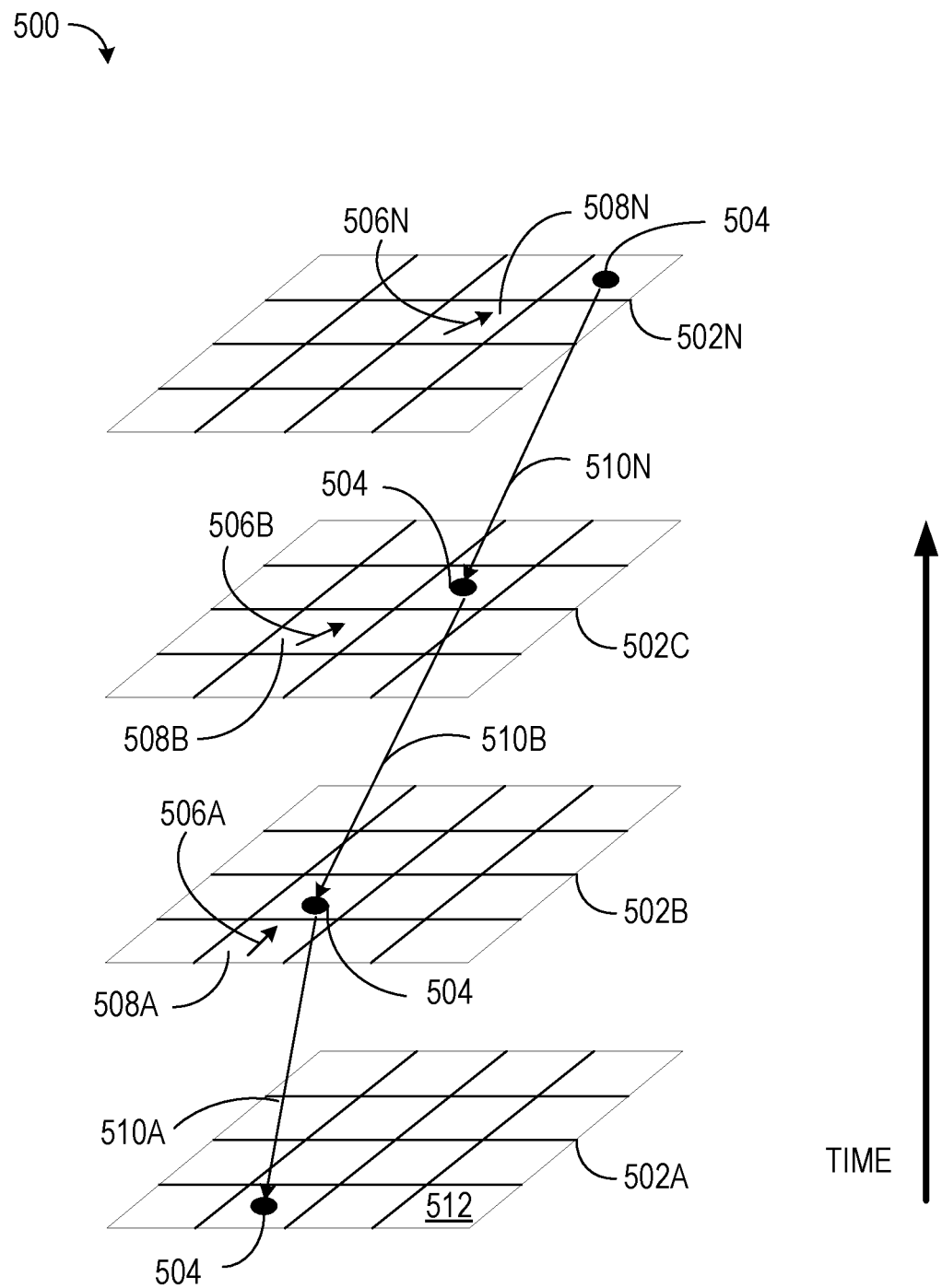
FIG. 5 schematically shows an example alignment of pixels of binary subframes of the scene in FIG. 4.

FIG. 5 shows a schematic illustration of a dynamic object 504 changing location within a field of view of SPAD array camera 102. For simplicity, dynamic object 504 is shown as being imaged by a single binary pixel in each illustrated subframe 502A, 502B, 502C, 502N, but it will be understood that a dynamic object likely would span multiple binary pixels in both horizontal and vertical directions. While each depicted subframe comprises sixteen binary pixels 512 for simplicity, it will be understood that each subframe of SPAD array camera 102 comprises a much larger array of binary pixels than illustrated. Further, while four subframes are shown for simplicity, any suitable number of subframes may be summed in the manner illustrated to form an image.

Imaging device 100 may be configured to determine motion vectors by comparing adjacent binary subframes and assigning motion vectors to binary pixels representing motion that occurred between a prior subframe and a current subframe. This is illustrated schematically in FIG. 5, in which motion vector 506A represents motion at binary pixel 508A between subframes 502A and 502B, motion vector 506B represents motion at binary pixel 508B between subframes 502B and 502C, and motion vector 506N represents motion at binary pixel 508N between subframes 502C and 502N, where 502N represents an arbitrary number of frames after subframe 502C. In this manner, motion vectors can be assigned to each binary pixel in each subframe, or any desired subset of binary pixels. Then, the subframes can be aligned based upon the motion vectors to form aligned subframes 500 and summed accordingly. The summing of binary pixels in FIG. 5 is indicated by lines 510A, 510B, and 510N, where the alignment of binary pixels in sequential subframes is based upon the motion vectors. In this example, one or more subframes are aligned such that the dynamic object appears in the location imaged in subframe 502A. In other examples, subframes may be aligned to position the dynamic object at an intermediate location, or an end location.

Motion vectors may be determined in any suitable manner. In some examples, motion vectors may be produced using methods commonly used by video encoding, except that the motion vectors are determined on a per-pixel basis, rather than for blocks of pixels. In other examples, motion vectors for aligning subframes may be determined for blocks of pixels.

Figure 6:
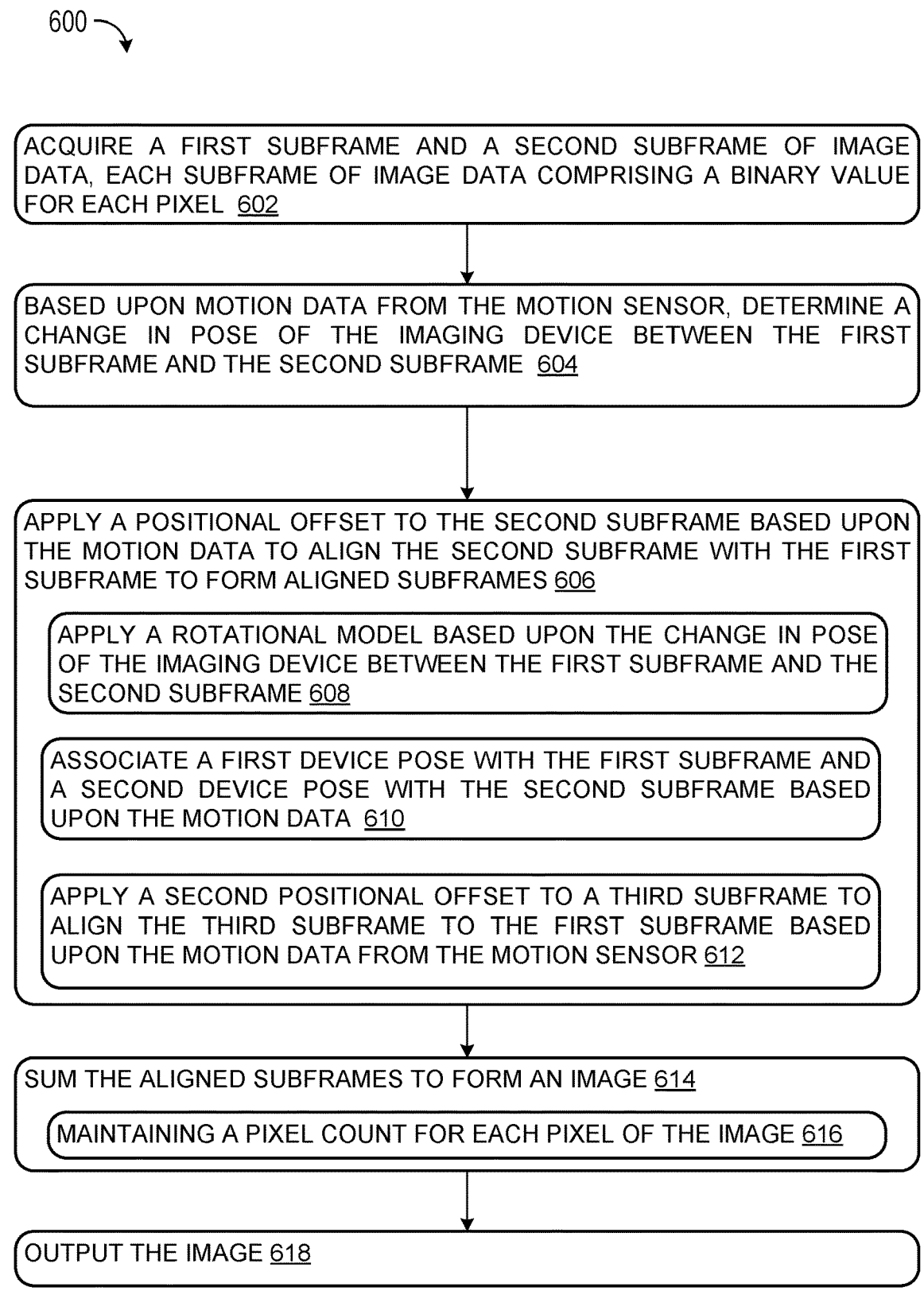
FIG. 6 shows a flow diagram depicting an example method of generating an image.

FIG. 6 shows a flow diagram illustrating an example method 600 of acquiring images via an imaging device comprising a SPAD array camera and a motion sensor. Method 600 may be implemented via imaging device 100, for example. Method 600 comprises, at 602, acquiring, via a SPAD array image sensor, a first subframe and a second subframe of image data, each subframe of image data comprising a binary value for each pixel of the image sensor. The first subframe and second subframe of binary image data represent any two subframes within a series of image data subframes acquired by the camera that are to be summed to produce an image.

Method 600 further comprises, at 604, determining a change in a pose of the imaging device between the first subframe and the second subframe based upon motion data from the motion sensor. As described above, where such motion occurs between subframes, stationary objects in the scene may be blurred due to the objects being imaged at different pixel locations in different subframes. As such, the determined change in pose may be used to align subframes to compensate for the motion of the imaging device.

Continuing, method 600 comprises, at 606, applying a positional offset to the second subframe based upon the motion data to align a stationary object imaged in the second subframe with a location of the stationary object as imaged in the first subframe, thereby forming aligned subframes. In some examples, the positional offset may be determined by applying a rotational model 608 based upon the change in pose, wherein the rotational model relates a rotational motion sensor signal to a direction and magnitude of movement of an imaged stationary object on the SPAD array sensor. In some examples, motion models may be used to determine device poses, and different device poses can then be associated with different subframe offsets, as indicated at 610. Additional subframes can be similarly adjusted based upon detected motion. This is indicated at 612, where a second positional offset is applied to a third subframe based upon motion data from the motion sensor. Offsets for additional subframes may be determined similarly as additional subframes are captured for an image.

Method 600 further comprises, at 614, summing the aligned subframes to form an intensity image. As mentioned above, this may comprise maintaining a pixel count 616, wherein the pixel count comprises a running sum of pixel values for aligned subframes. In other examples, any other suitable method may be used to sum aligned subframes. After summing all aligned subframes for an image, method 600 comprises, at 618, outputting the image.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
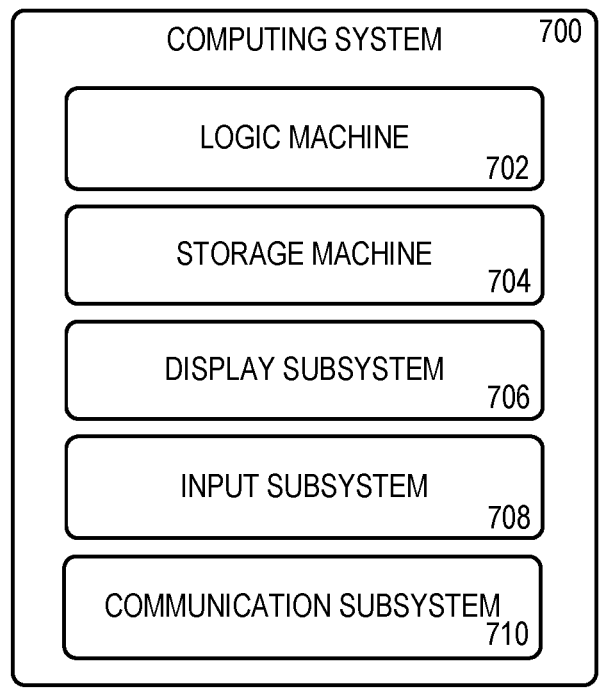
FIG. 7 shows a block diagram depicting an example computing device.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices. Imaging device 100 is an example of computing system 700.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example on an imaging device comprising a single photon avalanche detector (SPAD) array camera and a motion sensor, the SPAD array camera comprising a plurality of pixels each configured to sense light, a method comprising acquiring a plurality of subframes of image data, each subframe of image data comprising a binary value for each pixel, the plurality of subframes comprising a first subframe and a second subframe, based upon motion data from the motion sensor, determining a change in pose of the imaging device between the first subframe and the second subframe, applying a positional offset to the second subframe based upon the motion data to align a location of a stationary imaged feature in the second subframe with a location of the stationary imaged feature in the first subframe to create aligned subframes, summing the aligned subframes to form an image, and outputting the image. In some such examples, applying the positional offset alternatively or additionally comprises associating a first device pose with the first subframe and a second device pose with the second subframe based upon the motion data, and applying the positional offset based upon a difference between the first device pose and the second device pose. In some such examples, summing the aligned subframes to form an image alternatively or additionally comprises maintaining a pixel count for each pixel of the image, the pixel count for each pixel of the image comprising a sum of binary values for the pixel of the image across all aligned subframes. In some such examples, the positional offset is alternatively or additionally a first positional offset, and the method alternatively or additionally comprises applying a second positional offset to a third subframe to align a location of the stationary imaged feature in the third subframe to the location of the stationary imaged feature in the first subframe based upon the motion data from the motion sensor. In some examples, determining a change in pose of the imagining device alternatively or additionally comprises determining the positional offset by applying a rotational model based upon the change in pose of the imaging device between the first subframe and the second subframe and a distortion model of a lens system of the SPAD array camera. In some examples, the imaging device comprises a head-mounted device. In some examples, the imaging device alternatively or additionally comprises a handheld device. In some examples, the motion sensor alternatively or additionally comprises an inertial measurement unit.

Another example provides an imaging device, comprising a single photon avalanche detector (SPAD) array camera comprising a plurality of pixels, a motion sensor, a logic machine, and a storage machine comprising instructions executable by the logic machine to produce an image by acquiring a plurality of subframes of image data, each subframe of image data comprising a binary value for each pixel, the plurality of subframes comprising a first subframe and a second subframe; based upon motion data from the motion sensor, determining a change in pose of the imaging device between the first subframe and the second subframe; applying a positional offset to the second subframe based upon the motion data to align a location of a stationary imaged feature in the second subframe with a location of the stationary imaged feature in the first subframe to create aligned subframes, summing the aligned subframes to form an image; and outputting the image. In some examples the instructions are alternatively or additionally executable to apply the positional offset by associating a first device pose with the first subframe and a second device pose with the second subframe based upon the motion data, and to apply the positional offset based upon a difference between the first device pose and the second device pose. In some such examples, the instructions are alternatively or additionally executable to maintain a pixel count for each pixel of the image, the pixel count for each pixel of the image comprising a sum of all binary values for the pixel of the image across all aligned subframes. In some examples, the positional offset is a first position offset and the instructions are alternatively or additionally executable to apply a second positional offset to a third subframe to align a location of the stationary imaged feature in the third subframe to the location of the stationary imaged feature in the first subframe based upon the motion data from the motion sensor. In some examples, the instructions are alternatively or additionally executable to determine the positional offset by applying a rotational model based upon the change in pose of the imaging device between the first subframe and the second subframe and a distortion model of a lens system of the SPAD array camera. In some examples, the imaging device alternatively or additionally comprises a head-mounted device. In some examples, the imaging device alternatively or additionally comprises a handheld device.

Yet another example provides an imaging device, comprising a single photon avalanche detector (SPAD) array camera comprising a plurality of pixels, a motion sensor, a logic machine, and a storage machine comprising instructions executable by the logic machine to produce an image by acquiring a plurality of subframes of image data, each subframe of image data comprising a binary value for each pixel, the plurality of subframes comprising a first subframe and a second subframe; determining a motion vector for one or more pixels of a subframe based upon sequential subframes; aligning a portion of the second subframe comprising the one or more pixels with a corresponding portion of the first subframe based at least on the one or more motion vectors by applying an offset to the portion of the subframe to form aligned subframes; after aligning the portion of the second subframe with the corresponding portion of the first subframe, summing the plurality of subframes of image data to form the image; and outputting the image. In some examples, the instructions are alternatively or additionally executable to maintaining a pixel count for each pixel of the image, the pixel count for the pixel of the image comprising a sum of binary values for the pixel of the image across aligned subframes. In some examples the instructions are alternatively or additionally executable to determine the motion vector for one or more pixels of a subframe by inputting each subframe of image data into a video encoder. In some examples, the imaging device alternatively or additionally comprises a head-mounted device. In some examples, the imaging device alternatively or additionally comprises a handheld device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On an imaging device comprising a single photon avalanche detector (SPAD) array camera and a motion sensor, the SPAD array camera comprising a plurality of pixels each configured to sense light, a method comprising:
acquiring a plurality of subframes of image data, each subframe of image data comprising a binary value for each pixel, the plurality of subframes comprising a first subframe and a second subframe;
determining motion data comprising a motion vector for a first pixel of the subframe based upon sequential subframes and a different motion vector for a second pixel of the first subframe based upon the sequential subframes;
applying a first positional offset to the first pixel in the second subframe based upon the motion data to align a location of a first imaged feature at the first pixel in the second subframe with a location of the first imaged feature at the first pixel in the first subframe, and applying a second positional offset to the second pixel in the second subframe to align a location of a second imaged feature at the second pixel in the second subframe with a location of the second imaged feature at the second pixel in the first subframe to create aligned subframes;
summing the aligned subframes to form an image; and
outputting the image.

2. The method of claim 1, wherein applying the first positional offset comprises associating a first device pose with the first subframe and a second device pose with the second subframe based upon the motion data, and wherein applying the first positional offset comprises applying the first positional offset based upon a difference between the first device pose and the second device pose.

3. The method of claim 2, wherein summing the aligned subframes to form the image further comprises maintaining a pixel count for each pixel of the image, the pixel count for each pixel of the image comprising a sum of binary values for the pixel of the image across all aligned subframes.

4. The method of claim 2, further comprising applying a third positional offset to the first pixel in a third subframe to align a location of the first imaged feature at the first pixel in the third subframe to the location of the first imaged feature at the first pixel in the first subframe based upon the motion data from the motion sensor.

5. The method of claim 1, further comprising determining the first positional offset by applying a rotational model based upon a change in pose of the imaging device between the first subframe and the second subframe and a distortion model of a lens system of the SPAD array camera.

6. The method of claim 1, wherein the imaging device comprises a head-mounted device.

7. The method of claim 1, wherein the imaging device comprises a handheld device.

8. The method of claim 1, wherein the motion sensor comprises an inertial measurement unit.

9. An imaging device, comprising:
a single photon avalanche detector (SPAD) array camera comprising a plurality of pixels:
a motion sensor;
a logic machine; and
a storage machine comprising instructions executable by the logic machine to produce an image by:
acquiring a plurality of subframes of image data, each subframe of image data comprising a binary value for each pixel, the plurality of subframes comprising a first subframe and a second subframe;
determining motion data comprising a motion vector for a first pixel of the first subframe based upon sequential subframes and a different motion vector for a second pixel of the first subframe based upon the sequential subframes;
applying a first positional offset to the first pixel in the second subframe based upon the motion data to align a location of a first imaged feature at the first pixel in the second subframe with a location of the first imaged feature at the first pixel in the first subframe, and applying a second positional offset to the second pixel in the second subframe to align a location of a second imaged feature at the second pixel in the second subframe with a location of the second imaged feature at the second pixel in the first subframe to create aligned subframes;
summing the aligned subframes to form the image; and
outputting the image.

10. The imaging device of claim 9, wherein the instructions are executable to apply the first positional offset by associating a first device pose with the first subframe and a second device pose with the second subframe based upon the motion data, and to apply the first positional offset based upon a difference between the first device pose and the second device pose.

11. The imaging device of claim 10, wherein the instructions executable to summing the aligned subframes to form the image are further executable to maintain a pixel count for each pixel of the image, the pixel count for each pixel of the image comprising a sum of all binary values for the pixel of the image across all aligned subframes.

12. The imaging device of claim 10, wherein the instructions are further executable to apply a third positional offset to the first pixel in a third subframe to align a location of the first imaged feature at the first pixel in the third subframe to the location of the first imaged feature at the first pixel in the first subframe based upon the motion data from the motion sensor.

13. The imaging device of claim 9, wherein the instructions are further executable to determine the first positional offset by applying a rotational model based upon a change in pose of the imaging device between the first subframe and the second subframe and a distortion model of a lens system of the SPAD array camera.

14. The imaging device of claim 9, wherein the imaging device comprises a head-mounted device.

15. The imaging device of claim 9, wherein the imaging device comprises a handheld device.

16. An imaging device, comprising:
a single photon avalanche detector (SPAD) array camera comprising a plurality of pixels:
a motion sensor;
a logic machine; and
a storage machine comprising instructions executable by the logic machine to produce an image by:
acquiring a plurality of subframes of image data, each subframe of image data comprising a binary value for each pixel, the plurality of subframes comprising a first subframe and a second subframe;
determining a motion vector for a first one or more pixels of the first subframe based upon sequential subframes and a different motion vector for a second one or more pixels of the first subframe based upon the sequential subframes;
aligning a first portion of the second subframe comprising the first one or more pixels with a corresponding portion of the first subframe based at least on the one or more motion vectors by applying a first offset to the first portion of the second subframe, and aligning a second portion of the second subframe comprising the second one or more pixels with a corresponding portion of the first subframe based at least on the different one or more motion vectors by applying a second offset to the second portion of the second subframe to form aligned subframes;
after aligning the first portion of the second subframe with the corresponding portion of the first subframe and aligning the second portion of the second subframe with the corresponding portion of the first subframe, summing the plurality of subframes of image data to form the image; and
outputting the image.

17. The imaging device of claim 16, wherein the instructions are further executable to maintaining a pixel count for each pixel of the image, the pixel count for the pixel of the image comprising a sum of binary values for the pixel of the image across aligned subframes.

18. The imaging device of claim 16, wherein the instructions are further executable to determining the motion vector for the first one or more pixels of a subframe by inputting each subframe of image data into a video encoder.

19. The imaging device of claim 16, wherein the imaging device comprises a head-mounted device.

20. The imaging device of claim 16, wherein the imaging device comprises a handheld device.

* * * * *